United States Patent [19]
Molitor

[11] 3,966,433
[45] June 29, 1976

[54] PURIFIER

[76] Inventor: Victor D. Molitor, 2829 S. Santa Fe Drive, Englewood, Colo. 80110

[22] Filed: Apr. 24, 1974

[21] Appl. No.: 463,458

[52] U.S. Cl. ........................ 55/66; 55/73; 55/74; 55/179; 55/208
[51] Int. Cl.² .................................. B01D 53/04
[58] Field of Search ........... 55/33, 66, 74, 75, 208, 55/389, 269, 73, 179

[56] References Cited
UNITED STATES PATENTS

| | | | |
|---|---|---|---|
| 3,085,379 | 4/1963 | Kiyonaga et al. | 55/58 |
| 3,446,031 | 5/1969 | Chi et al. | 55/269 |
| 3,467,493 | 9/1969 | Eguchi et al. | 55/66 |
| 3,683,591 | 8/1972 | Glav | 55/34 |
| 3,734,293 | 5/1973 | Biskis | 55/208 |

FOREIGN PATENTS OR APPLICATIONS

| | | | |
|---|---|---|---|
| 961,925 | 6/1964 | United Kingdom | 55/66 |

*Primary Examiner*—Charles N. Hart
*Assistant Examiner*—Robert H. Spitzer
*Attorney, Agent, or Firm*—Horace B. Van Valkenburgh; Frank C. Lowe

[57] ABSTRACT

A purifier having a central core in which is disposed a container for gettering material surrounded by electric heaters. Labyrinth passageways for heat exchange between the incoming and outgoing gases is formed by a series of "cans" which are welded in position and have an increasing end plate diameter and shell diameter from the core outwardly. Interspersed shells provide for incoming (outgoing) gas to pass from one end to the opposite end of a cylindrical passage, then turn around the end of the shell and pass in the opposite direction along the next inner (outer) passage. The incoming gas is transferred between passages by holes in alternate end plates, while the outgoing gas is transferred between one passage and the next outer passage by a "floating" end plate, around the inside circle of which the outgoing gas passes.

A second container of gettering material, if desired, operating at a lower temperature can be interposed in the central core, but is insulated from the first container. The outgoing gases, when reduced to the desired temperature for the second gettering material may be passed into and through the second container, then resume transmission through the labyrinth passages.

7 Claims, 14 Drawing Figures

Fig_1

Fig_2

Fig_3

Fig_4

Fig_8a

Fig. 8b

Fig_8c

Fig_9

Fig_10

Fig_11

Fig_12

PURIFIER

This invention relates to purifiers, and more particularly to purifiers provided with gettering material for removing selected gas or gases from another gas or gases.

The purifier is utilized in purifying gases, such as argon or helium, from which reactive gases, such as hydrogen, oxygen, water vapor, gaseous carbon compounds and nitrogen, are removed. The purifier of this invention is, of course, applicable to the purification of any gas or gases, whether or not circulated from and back to an enclosure utilized for particular purposes, at pressures from atmospheric or above to relatively high vacuums. Examples of gettering material include copper chips for removal of oxygen, sponge titanium or sponge zirconium for removal of hydrogen, nitrogen, oxygen and/or water vapor, "Dow Q" for removal of oxygen, "Linde Sieve" for removal of water vapor, as well as numerous other types of gettering material.

The present end comprises a unique assembly of "cans" or end walls with extending shells to preheat the incoming gas by heat transfer with the outgoing gas, with a heater surrounding the active bed of gettering material to maintain the bed at a desired temperature. When partially through the purifier, the outgoing gas may be passed through another bed of gettering material at a different temperature.

The novel features of the invention will become apparent from the description which follows, taken in conjunction with the accompanying drawings, in which:

FIG. 1 is a perspective view of a purifier constructed in accordance with this invention.

FIG. 2 is a left side view of the purifier of FIG. 1.

FIG. 3 is a front view of the purifier of FIG. 1

FIG. 4 is a rear view of the purifier of FIG. 1.

As in FIGS. 1–4, the invention is illustrated as utilized for the purification, for instance, of argon and helium atmospheres used in a glove box, with two beds of opposed, interspaced sponge titanium gettering material operating at a temperature on the order of 1200° to 1300°F and at a temperature on the order of 700° to 900°F. In the higher temperature bed, the sponge titanium appears to adsorb $N_2$, $O_2$, $NH_3$ and hydrocarbons, while the lower temperature bed primarily adsorbs $H_2$. The gas or gases to be purified pass from the enclosure, such as a glove box, through an inlet tube 10 to a filter F, which may be of any conventional type, such as to remove particles in excess of 4 microns in size, thence through a transfer tube 11 to a blower B, which again may be of any conventional type, such as adapted to handle on the order of 135 cubic feet per minute for a 600 cubic foot glove box. From the blower, the gas passes through a transfer tube 11 to a purifier P and, as in FIGS. 2 and 3, through an additional transfer tube 13 to a supplemental heat exchanger E to exit from the latter through an outlet tube 14 and back to the glove box.

Purifier P may be cylindrical in shape, supported by legs 15 attached at appropriate positions to the underside of the cylindrical wall 16 of the purifier. The ends of the cylindrical wall 16 are closed by a circular front end plate 17 and a circular rear end plate 18, as in FIGS. 3 and 4, respectively. Front end plate 17 is provided with a circular aperture, as will hereinafter appear, closed by a circular cover plate 19, while rear end plate 18 is provided with a rectangular hole covered by a rectangular cover plate 20. Appropriately placed studs 21 extend from the front and rear end plates, respectively, for attachment of the cover plates to the end plates. Both end plates are provided with a thermocouple tube 22 or 22' for the insertion of a thermocouple and extending within the purifier, while the rear end wall 18 is provided with spaced, protective caps 23 for covering the binding posts for the electrical resistance connection to heaters within the purifier.

Figure 5:
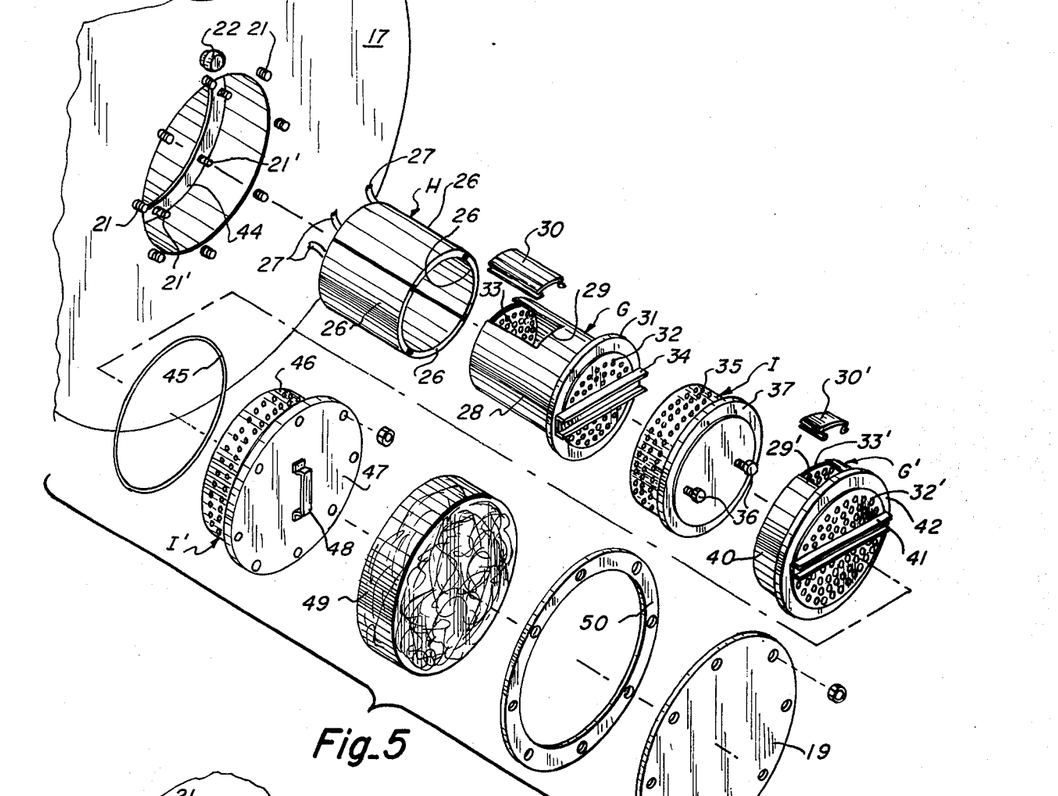
FIG. 5 is an exploded perspective view of certain parts placed centrally within the purifier and removable for inspection or replacement of gettering material.

As illustrated in FIG. 5, a central core of the purifier P comprises elements which are removable through a circular hole 25 in the front end plate 17 and include a heater assembly H comprising four quadrant shaped heaters 26, the leads 27 to which are connected as described later. Conveniently, all of the heaters 26 are in parallel, with all connections made at the end shown. Within the heater assembly H is a gettering basket or container G having a cylindrical wall 28 provided with an opening 29 in which a removable access plate 30 is normally placed, together with a hollow cylindrical end flange 31 and perforated end plates 32 and 33. A short channel 34 extends across the end flange 31 and is attached thereto, to provide spacing between the gettering basket G and an insulation plug I, as well as to provide an area for engagement by a tool, such as a pair of tongs, in removing the gettering basket from the assembly. In use, heated gases move through the perforated end plate 33 into the interior of the gettering basket to contact the gettering material, as indicated above. The heater assembly H surrounding the gettering basket G is normally left in position, except to remove it for repairs or replace it with a heating unit having different wattage elements.

Insulation plug I is provided with a perforated cylindrical wall 35, within which is disposed the insulation, such as a ceramic type, in blanket form, particularly witout any organic binders. A pair of bolts 36 mounted on a front plate 37 are adapted to abut the rear of a second gettering basket G', again containing a suitable gettering material. The rear side of insulation plug I is also provided with a similar pair of rearwardly extending bolts which engage the inside of the channel 34 of the gettering basket G to hold the gettering baskets G and G' in position.

The gettering basket G' may be shorter than the gettering basket G and contain a lesser amount of gettering material within a cylindrical wall 40 having an opening 29' in which a removable access plate 30' is normally placed. Basket G' also has perforated end plates 32' and 33', through the holes of which the gases flow, in order to contact the gettering material at a lower temperature than the gettering material in the basket G. Basket G' is also provided with a channel 41 which extends across plate 32', being attached to a flange 42. Outwardly from the gettering basket G' is another insulation plug I' which is sealed against an inside ring 44 of the core by an O-ring 45. The insulation plug I' is provided with a perforated side wall 46 and a circular front plate 47 provided with holes, as shown, for an additional set of studs 21' just inside the purifier. Front plate 47 is provided with a handle 48 for placement and removal, being secured within the purifier by nuts, one of which is shown, engaging inner studs 21'. Outwardly from the insulation plug I' is a mass of insulation 49 which is normally manually inserted in and removed from the opening 25. As indicated previously, cover plate 19 covers the opening 25 and is sealed to plate 17 by a gasket 50 through tightening of the nuts, as shown, on the outer studs 21.

Figure 6:
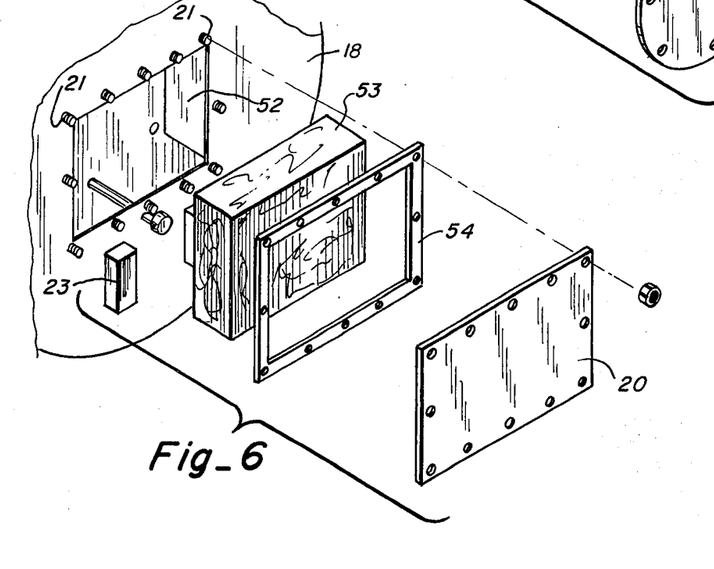
FIG. 6 is another exploded perspective view of certain parts removable from the opposite end of the purifier for inspection or replacement of insulating material.

At the rear, rectangular plate 21 closes an opening 52 in the rear end plate 18, with a block 53 of insulation being packed manually in the opening. A rectangular gasket 54 seals the cover plate 21 to the rear end plate 18, being attached by nuts, as indicated, on the studs 21.

Figure 7:
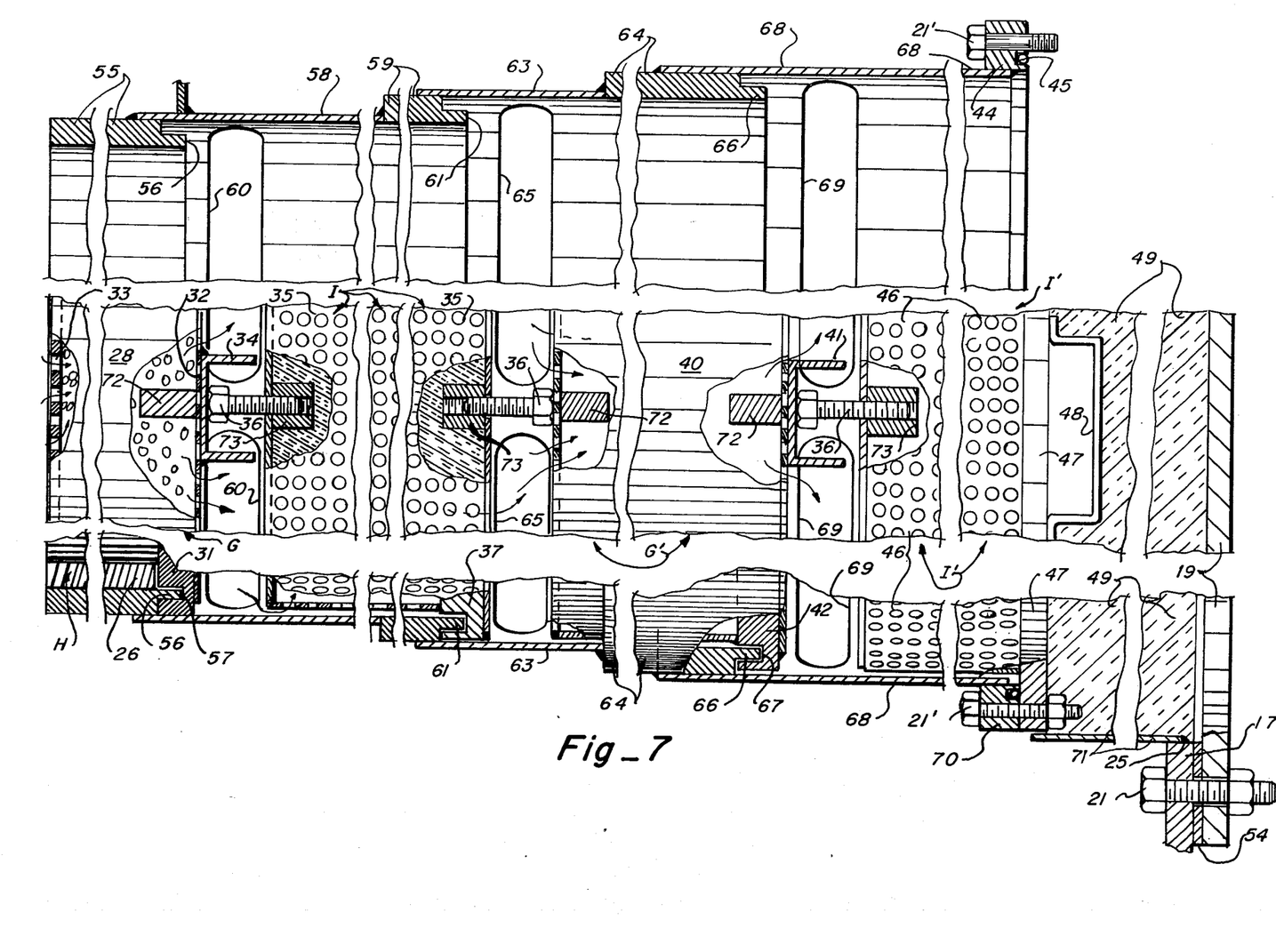
FIG. 7 is a condensed longitudinal section, on an enlarged scale, of the core of the purifier, illustrating primarily parts shown in FIG. 5, with the upper portion of the section showing only the core wall.

It will be noted that the various parts disposed centrally in the purifier and shown in FIG. 5 increase in diameter from the rear to the front, so that all of the parts may be removed or positioned without undue difficulty, since the labyrinth-like heat exchanger fills the remainder of the purifier housing. As in FIG. 7, the inner core includes a cylindrical shell 55 which surrounds the heater assembly H and the gettering basket G inside the heaters. At its front end, the shell 55 is provided with an axially extending flange 56 which is engaged by an annular slot 57 in the end flange 31 of the gettering basket G. From the shell 55, a thin shell 58, the inner end of which surrounds and is welded to the shell 55, extends to a thicker shell 59 which, with shell 58, surrounds the insulation plug I. Shell 58 has slots 60 for the egress of gases which pass through the gettering basket G. The thicker shell 59 is provided with a forwardly extending flange 61 for coaction with a slot 62 in front flange 37 of the insulation plug. As will be evident, the flange 56 of shell 55 cooperates with the slots 57 of the gettering basket G, and the flange 61 of shell 59 cooperates with the slot 62 of the insulation plug, to maintain these elements in position. As will be noted, the bolts 36 may be adjusted so that the insulation plug, when installed, pushes the gettering basket into position and also causes the gettering basket G' to hold the insulation plug I in position. Encircling the outside of the shell 59 and attached thereto, as by welding, is a thin shell 63 which is attached at its other end to a thicker shell 64, which together enclose the gettering basket G'. The shell 63 is provided with a radial series of aperatures or slots 65 to permit gases to flow into the central core, for passage through the gettering basket G'. The thicker shell 64 is provided with a front flange 66 which engages a slot 67 on the rear side of the front flange 42 of the gettering basket G', to maintain the latter in position. Surrounding and attached thereto, as by welding, as well as extending forwardly from the thicker shell 64 is a thinner shell 68 having a series of radial slots 69 therein, for passage of the gases, which have moved through the gettering basket G', into the space outside the shell 68. Attached, as by welding, to the outer end of shell 68 is ring 44 carrying studs 21' for insulation plug I' and also having a recess therein for O-ring 45. A shell 71, which encircles insulation 49, is welded to end plate 17, on the inside of opening 25. On its inside, insulation plug I' is provided with a pair of bolts 36 engaging the basket G' and spacing the insulation plug I' therefrom. Both basket G and basket G' are provided with inside reinforcing bars 72 which extend across the respective perforated ends 32, 32' and 33', while insulation plugs I and I' are provided with stiffening bars 73 in a similar position but provided with tapped holes for bolts 36.

Figure 8A:
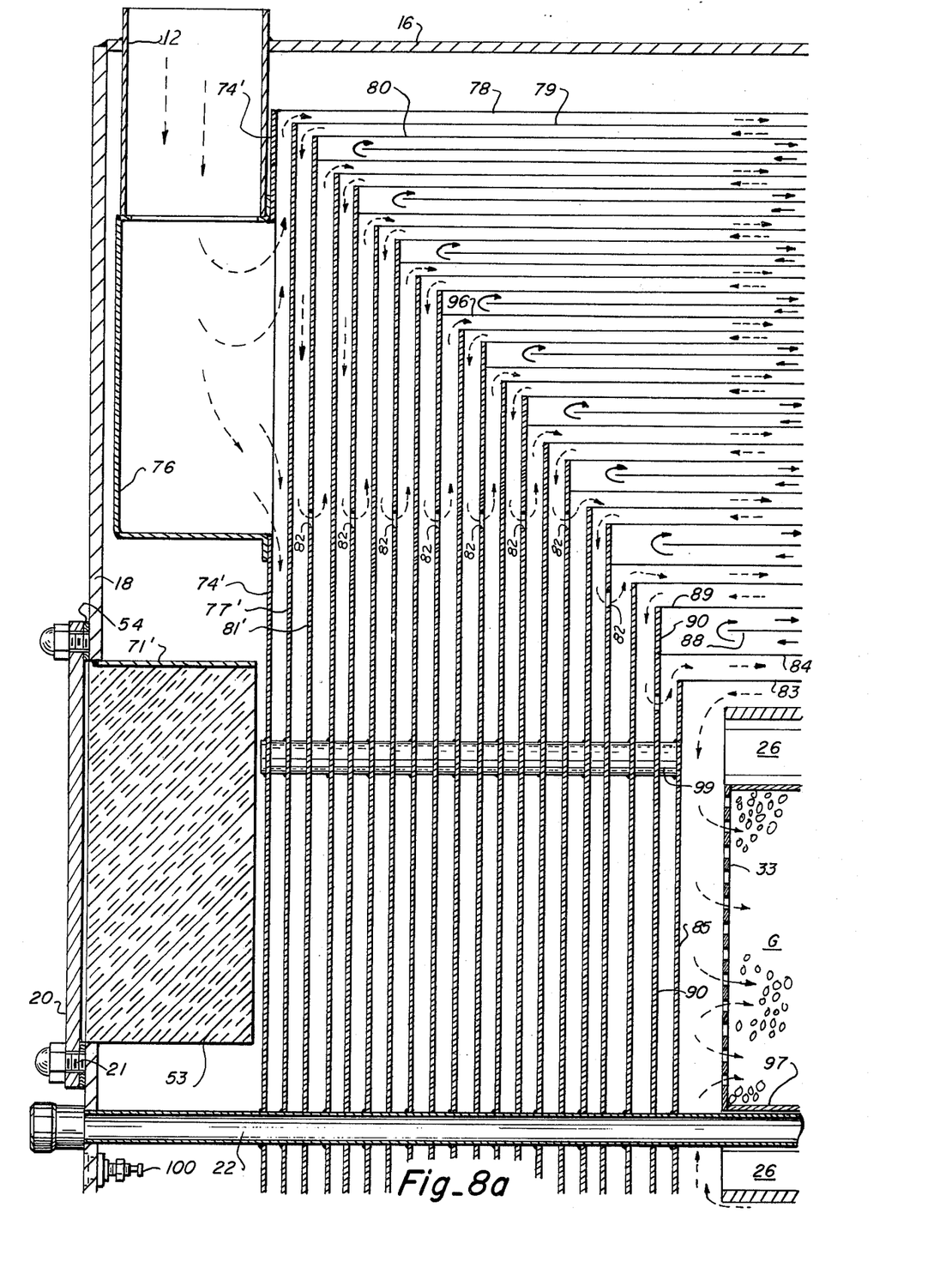
FIGS. 8a, 8b and 8c together comprise a fragmentary, horizontal section taken along the line 8—8 of FIG. 4 but on an enlarged scale.
Figure 8B:
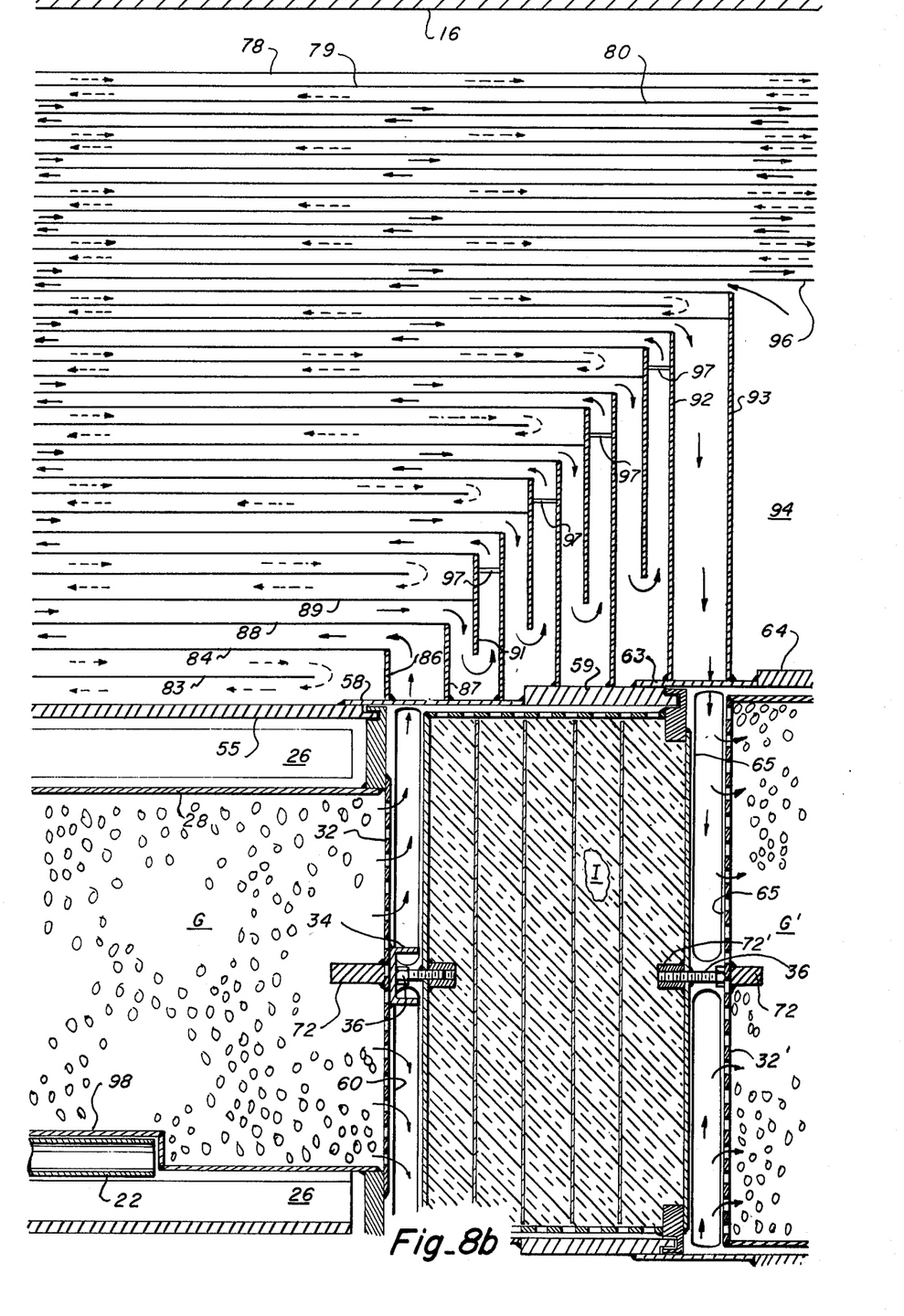
Figure 8C:
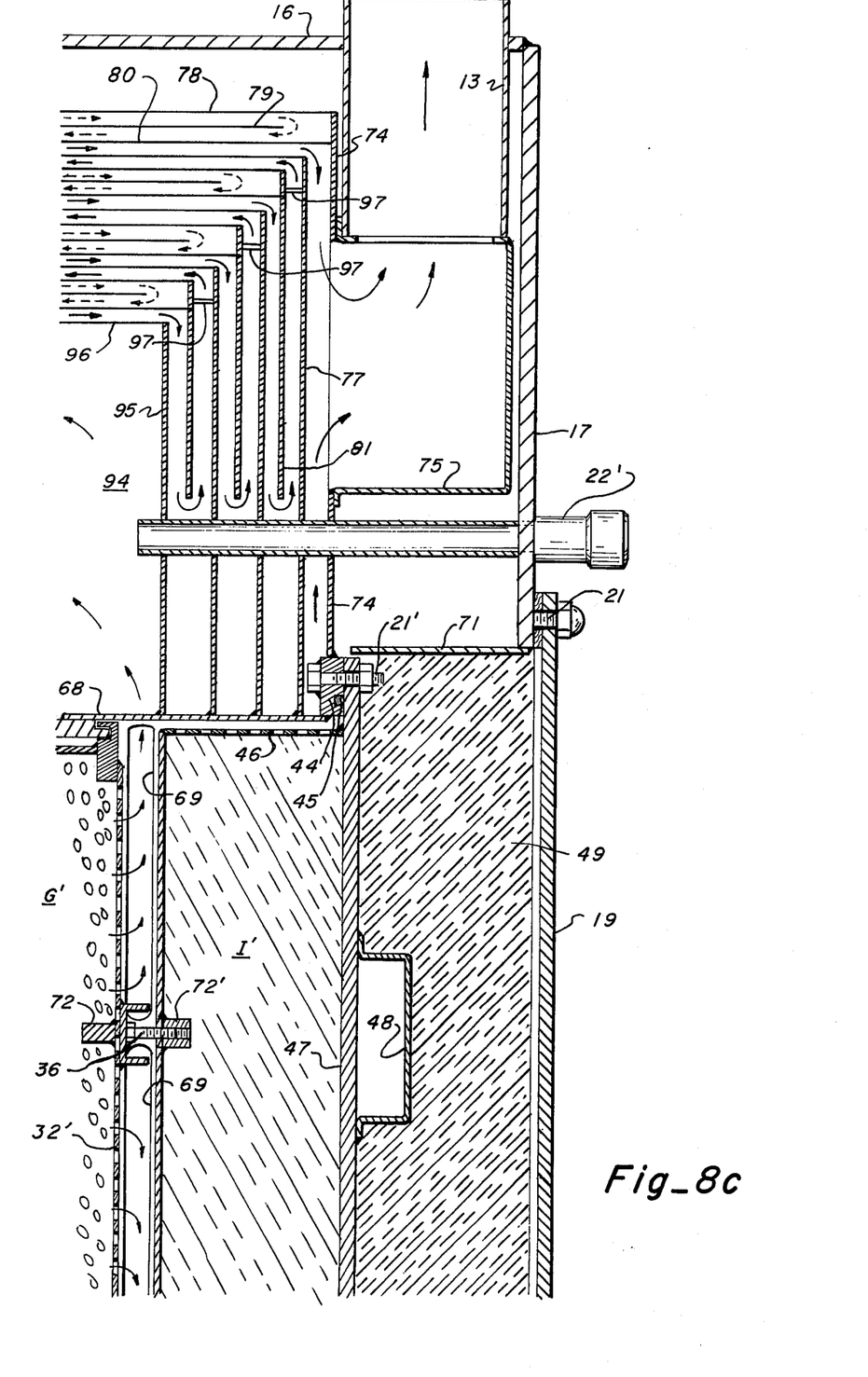

The ring 44, as in FIG. 8c, is supported by outside end plate 74 of the labyrinth heat exchanger, which is also connected to an outlet box 75, in turn connected to outlet tube 13. Additional support for the outside end plate 74 may be provided by additional connection to the housing and particularly to the front end plate 17.

In general, the gas or gases to be purified enter inlet tube 12 and then an inlet box 76 of FIG. 8a to flow across a cylindrical area between the outside inlet end plate 74' and the next inner plate 77'. It will be noted that the dotted arrows of FIGS. 8a, 8a and 8c indicate the flow of b from the inlet tube through the labyrinth heat exchanger and thence to the gettering basket G, while the solid arrows indicate the flow of gas from the gettering basket G through a portion of the labyrinth, then to the gettering basket G', and then outwardly therefrom. The gas or gases, during flow to the gettering basket G, are heated by heat exchange with gases which have passed through the gettering basket and have been heated approximately to the temperature maintained therein, such as between 1200° and 1300°F. The outgoing gases from the gettering basket G preheat the incoming gases until cooled down to the desired temperature at the gettering basket G', such as between 700° and 900°F. It will be noted that the gases flowing from the inlet box 76 into the outer space between end plates 74' and 77' will tend to fill the space between a pair of cylindrical shells 78 and 79, the first of which is attached between the outer edge of the outside inlet end plate 74' and the outer edge of the outside outlet end plate 74. While the shell 79 is attached to the edge of end plate 77', at its opposite end, it terminates short of the outlet end plate 74, as in FIG. 8c. Thus, the gas or gases turn at the dotted arrow shown, around the end of shell 79, to flow along the cylinder between shell 79 and the next inner shell 80, which is attached between outside outlet plate 74 and the next inlet end plate 81', as in FIG. 8a. The latter is provided with an annular series of holes 82 which transfer the incoming gases from between plates 77' and 81' to the next inner passage, which decreases in diameter inwardly. It will be noted that there are pairs of cylindrical passages through which the incoming gas flows in opposite directions and pairs of adjacent passages in which the outgoing gas flows in opposite directions. However, these pairs of passages surround each other so that the effect is the same as though there were single passages with a heat transfer wall between, except for the outermost incoming passage.

It will also be noted that the incoming gas shifts from one pair of passages to the next pair of passages through holes 82 in alternate inlet end plates, the incoming gas being transferred to the next inlet passage by turning around the end of shell 79 and similar shells which decrease in both length and diameter inwardly. Thus, the incoming gas finally passes around the end of an inner shell 83, after having flowed between shell 83 and the next inner shell 84, to the space between inner inlet end plate 85 and perforated end plate 33 of basket G, for flow through the basket to contact the gettering material.

After final heating and contact with the gettering material in basket G, the hot gases flow through slots 60 in shell 58 and into a cylindrical passage between the innermost outlet end plate 86 and the next end plate 87. Since shell 84 is attached to end plate 86, the hot gases flow between shell 84 and the next outer shell 88 which, in turn, is attached to the outer edge of plate 87, as in FIG. 8b. When the gases arrive at the end of shell 87, they will flow around it, as indicated by the solid arrows of FIG. 8a, and into the next outer passage, between shell 88 and the next outer shell 89. Both shells 84 and 89 are attached to an end plate 90, the next outer inlet end plate from end plate 85. The hot gases, after passing between shells 88 and 89, will turn around the inner edge of a "floating" end plate 91 of FIG. 8b. Similar passage between shells, turning around the end of a shell to shift one passage outwardly at the inlet end and shifting around the inner edge of a "floating" end plate at the outlet end, brings the hot gases, cooled somewhat by heat exchange with incoming gases, to an annular space between outlet end plates 92 and 93, from whence the gases flow through slots 65 and then through the gettering basket G'. After egress from the latter and through slots 69, the outgoing gases flow into a space 94 between end plates 93 and 95, then into the cylindrical space just inside a shell 96, then around the opposite end of shell 96, as in FIG. 8a. The outgoing gases will then follow a similar path, progressing outwardly and turning at the inlet end around a shell and at the outlet end around a "floating" end plate, until the passage between end plates 74 and 77 is reached, from which the gases flow into the outlet box 75.

It will be noted that end plates 86, 87, 92, 93 and similar end plates are attached to the central core, as to core shell 58, 59, 63 or 68. However, end plates 81, 91 and similar end plates are not attached to the core, and for this reason, have been referred to as "floating". For a sturdier construction, a series of pins or studs 97 may be mounted on the fixed end plates and attached, as by welding, to the "floating" end plates. The number of reinforcing pins 97 at each stage will normally vary in accordance with the diameter at the pins. Thus, one pin for every 6 to 8 inches of circumference may be utilized. The outgoing gases are transferred from an inner cylindrical passage to the next outer cylindrical passage by passing around the end of a cylindrical shell, such as shell 88. As indicated by the dotted and solid arrows, the incoming gases are always flowing in countercurrent relation to the outgoing gases.

In order to control the temperature to which the gettering material is heated, a conventional thermocouple may be placed in thermocouple tube 22 which extends into an offset 98 in gettering basket B, as in FIGS. 8a and 8b. Wire tubes 99 may extend through the inlet end plates for the wires for heating element 26, there being preferably four electrical wire lead tubes 99, each spaced at 45° from the horizontal. The lead wires are attached to a pair of binding posts 100, on the inside of rear end plate 18 and opposite caps 23. Thermocouple tube 22' extends through the outlet end plates and into space 94, with a conventional thermocouple placed therein to monitor the temperature of gases exiting from gettering basket G'.

In constructing the labyrinth passageways, the first phase is to construct the inner core, from the ring 70 back to the shell 55, then attach the outside outlet end plate 74 to the ring 70. Outlet box 75 may be welded to plate 74, either before or after attachment of the latter to ring 70. Alternately, outlet end plates, such as 77 and 93, down to passage 94, may be welded to the shell 68, with the "floating" end plates, such as end plate 81 merely hung on the core, while the next and succeeding end plates are attached to or hung on the core. End plate 86 may be attached to shell 84 prior to attachment to the core, thus constituting an open ended "can", as referred to previously. Shell 88 may then be welded to end plate 87. The next "can" comprises inlet end plate 85, to which shell 83, as well as thermocouple tube 22 and electrical wire tube 99 are attached prior to placement of the assembly. Then, another "can" comprising inlet end plate 90 to which shell 84 is attached, may be placed in position and welded to tubes 22 and 99, while shell 84 is then welded to outlet end plate 86, or vice versa. Shell 88, which was installed in the assembly prior to positioning end plate 90 but moved rearwardly against end plate 90 to provide clearance for welding the front end of shell 84 to end plate 86, may then be welded to end plate 87. Then, shell 89 may be welded to outlet end plate 91 and inlet end plate 90 in the position shown. Pins 97 may be welded between end plate 91 and the next outer outlet end plate, either before or after welding to shell 89. As will be evident, the steps of adding "cans" and shells to the outlet end plates attached to the core may proceed in the manner described above until shell 78 is attached between end plates 74 and 74'.

Figures 9, 10, 11, 12:
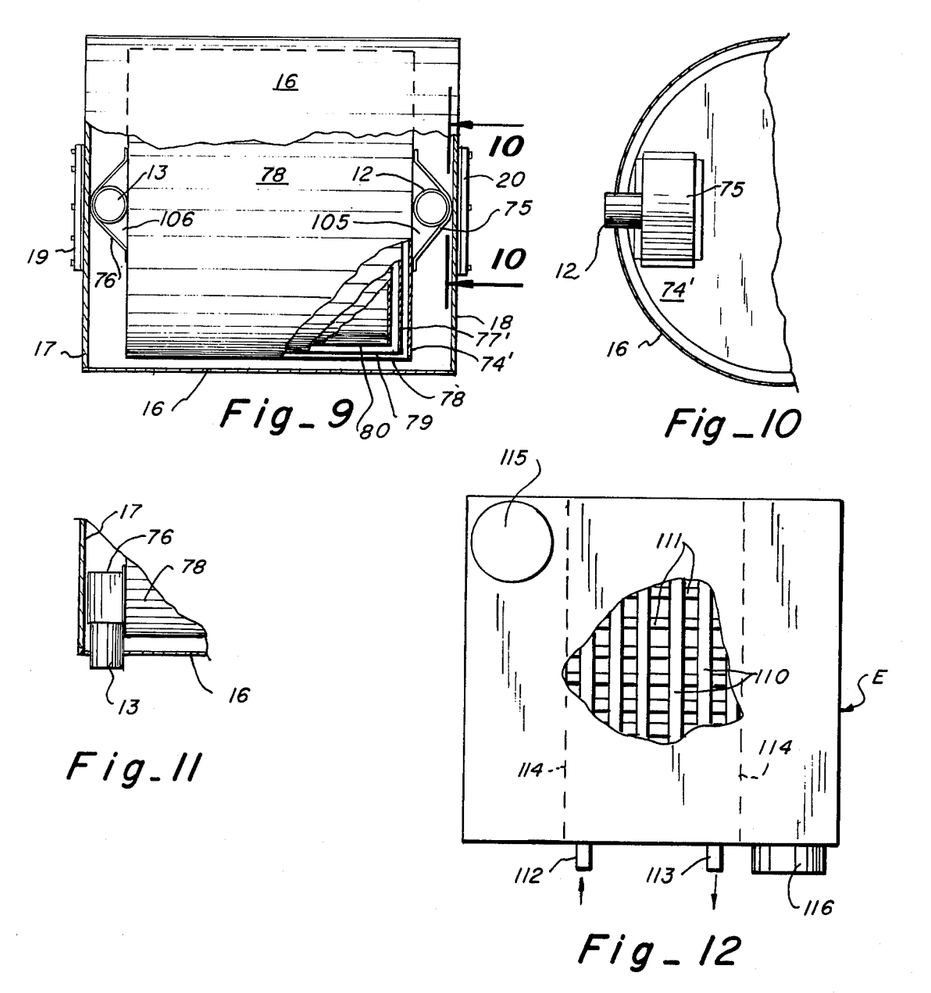
FIG. 9 is a side elevation of the purifier with the cover or housing broken away to show the last "can" and the inlet and outlet connected thereto, the last "can" also being broken away to show the interior construction thereof.
FIG. 10 is a fragmentary vertical section taken along line 10—10 of FIG. 9 and showing particularly the outlet of the purifier.
FIG. 11 is a fragmentary top view of the outlet shown in FIG. 10, with the housing or casing in section.
FIG. 12 is a top plan view of the supplemental heat exchanger of FIG. 1.

Previous reference to the "can" construction is occasioned by the fact that the innermost inlet end plate 85 and its shell 83 are in the form or configuration of a can, as is also the next innermost inlet end plate 90 and its attached shell 84, which may be attached to outlet end plate 86 at the time of installation. The can configuration is also shown in FIG. 9, in which the "cans" formed with end plate 74' and 77' are evident. Additional shells are attached between an inlet end plate and an outlet end plate, such as shell 89, at the time that the "can" is installed. The operation proceeds outwardly, with additional shells and plates added to the structure, leaving space 94 opposite the gettering basket G', to receive the outflow from the lower temperature gettering basket. The inlet end plates are stiffened by the thermocouple tube 22 and also the electrical lead tubes 88, while the outlet end plates, except for the "floating" end plates, are attached to the core. While the volume of gas which will flow through the passages limits the amount of gas which can be passed through the purifier, it will be noted that the outer passages are relatively narrow, but that they become progressively thicker in an inward direction and thereby each can handle a sufficiently large volume of gas. The gettering basket G, the core and parts therearound, and the end plates and shells adjacent thereto are preferably formed of steel, either hot rolled or cold rolled. Outwardly from the steel parts, where the temperatures are lower, stainless steel may be utilized, while the still lower temperature portions of the shells may be formed of copper, to improve heat transmission between the respective passages.

The outlet and inlet boxes 75 and 76, respectively may slope upwardly from the end plates 74 and 74', respectively, as in FIGS. 9–11. An end wall 105 or 106 having a hole for attachment of tube 12 or 13 may close one end of the box, while a similar end wall, but without a hole, closes the opposite end. Both box 75 and 76 and the end walls thereof may be provided with flanges for attachment, as by welding, to the respective end plates.

The outgoing gases cannot normally effect a complete heat exchange with the incoming gases, although the labyrinth path greatly increases the efficiency of the process. Of course, the gas or gases are also preheated by the blower, such as to a temperature of 240°F and may be discharged from the purifier at somewhat the same temperature. Thus, the heat exchanger E, as in FIG. 12, is a combination of parallel tubes 110 and 111, extending in both directions and connected together at looped ends. The heat exchanger receives cooling water at an inlet 112 and discharges it at an outlet 113, with the tubes being limited to the area between dotted lines 114. The gases from the purifier are received through an inlet 115 from transfer tube 13 and discharged through an outlet 116 to outlet tube 14. As will be observed, the gases coming in through inlet 115 will flow into the compartment between the left dotted line 114 and the adjacent side of the box-shaped structure, then flow between and around the tubes 110 and 111 for collection in the area between right dotted line 114 and the adjacent edge of the structure and discharged through outlet 116.

It will be evident that the construction described may be converted to one having only one basket of gettering material, through the omission of basket G' and insulation plug I' and moving outlet end plate 95 closer to end plate 92 and making end plate 93 a "floating" end plate.

Although a preferred embodiment of this invention has been illustrated and described, it will be evident that other embodiments may exist and that various changes may be made, all without departing from the spirit and scope of this invention.

What is claimed is:

1. A purifier comprising:
    a first series of passages in heat exchange relationship with a second series of passages provided by opposed, interspaced cylindrical shells connected to end plates and having a circular periphery of decreasing diameter inwardly, said shells being of decreasing diameter and length from the outside inwardly;
    a container for gettering material disposed centrally of said shells;
    a heater for heating said gettering material to a predetermined temperature and for heating the gases passing through said container;
    said end plates including alternate end plates at one end of said shells having holes for transferring incoming gases from one incoming passage to the next incoming passage;
    alternate end plates at the opposite end being annular with an inside diameter permitting passage of outgoing gases from one outlet passage to the next outer outlet passage; and
    additional shells extending from each end plate toward the opposite end plate but being spaced from the opposite end plate to permit gases to pass around the spaced edges of said additional shells.

2. A purifier as defined in claim 1, wherein:
    a central, hollow core surrounds said container for gettering material and also a plug of insulation at the outlet thereof; and
    said core is provided with slots for the passage of gas into said container and out of said container.

3. A purifier as defined in claim 1, wherein:
    said heater for said container is an electrical heater; and
    a series of tubes for the leads to said electrical heater reinforce said end plates at one end.

4. A purifier as defined in claim 1, including:
    pins adjacent the outer edges of and attached to end plates attached to said core, said pins extending to and attached to adjacent end plates not attached to said core.

5. A purifier comprising:
    a first series of labyrinth passages in heat exchange relationship with a second series of labyrinth passages;
    said heat exchange passages being provided by cylindrical shells connected to end plates having a circular periphery of decreasing diameter inwardly;
    a container for gettering material disposed centrally of said shells;
    means for heating said container and the gettering material therein to a predetermined temperature;
    a central, hollow core surrounding said container for gettering material and also a plug of insulation at the outlet thereof;
    said core being provided with slots for the passage of gas into said container and out of said container;
    a second container for gettering material within said core and on the opposite side of said first insulation plug from said first container; and
    a second insulation plug on the side of said second container opposite said first plug.

6. A method of purifying a predetermined gas to remove at least two gaseous impurities, wherein one or more of said impurities are removed by a first gettering material operating at a predetermined temperature and one or more of such gaseous impurities are removed by a gettering material operating at a lower temprature; which comprises:
    passing incoming gas to be purified through a labyrinth passageway in heat exchange relation to the outgoing gases and through a bed of said first gettering material heated to said predetermined temperature;
    during said passage of the outgoing gases in heat exchange relation with the incoming gases, passing the same through said second bed at said lower temperature; and
    passing said outgoing gases from said second bed in heat exchange relationship with said incoming gases at temperatures below said lower temperature.

7. A method of purifying as set forth in claim 6, wherein:
    said gas is an inert gas;

said first gettering material comprises titanium previously heated to 1600°F or above in an inert gas, said titanium of said first bed being heated to between 1200°F and 1300°F for the removal of nitrogen; and said second gettering material comprising titanium heated to a temperature on the order of 900°F for the purpose of removing hydrogen, ammonia and hydrocarbons.

* * * * *

UNITED STATES PATENT AND TRADEMARK OFFICE
CERTIFICATE OF CORRECTION

PATENT NO. : 3,966,433
DATED : June 29, 1976
INVENTOR(S) : Victor D. Molitor

It is certified that error appears in the above-identified patent and that said Letters Patent are hereby corrected as shown below:

Column 4, line 22, before "outside" --one-- should be inserted; line 33, "8a" (second occurrence) should read --8b--; line 34, "b" should read --gas--.

Column 2, line 65, "witout" should read -- without --.

Signed and Sealed this

Thirtieth Day of November 1976

[SEAL]

Attest:

RUTH C. MASON
*Attesting Officer*

C. MARSHALL DANN
*Commissioner of Patents and Trademarks*